US008791969B2

(12) United States Patent
Kim et al.

(10) Patent No.: US 8,791,969 B2
(45) Date of Patent: Jul. 29, 2014

(54) DISPLAY DEVICE

(75) Inventors: Yong-Jo Kim, Asan-si (KR); Yoon-Jang Kim, Suwon-si (KR); Yoon-Sung Um, Yongin-si (KR); Jong-Hee Na, Asan-si (KR); Young-Min Choi, Hwaseong-si (KR)

(73) Assignee: Samsung Display Co., Ltd., Yongin (KR)

( * ) Notice: Subject to any disclaimer, the term of this patent is extended or adjusted under 35 U.S.C. 154(b) by 545 days.

(21) Appl. No.: 13/157,741

(22) Filed: Jun. 10, 2011

(65) Prior Publication Data

US 2012/0033001 A1 Feb. 9, 2012

(30) Foreign Application Priority Data

Aug. 5, 2010 (KR) ........................ 10-2010-0075588

(51) Int. Cl.

| | |
|---|---|
| ***G09G 5/02*** | (2006.01) |
| ***G09G 3/36*** | (2006.01) |
| ***G06F 3/038*** | (2013.01) |
| ***G02F 1/1343*** | (2006.01) |

(52) U.S. Cl.

USPC ............... 345/697; 345/88; 345/92; 345/204; 349/39

(58) Field of Classification Search

USPC .......................................................... 345/204

See application file for complete search history.

(56) References Cited

U.S. PATENT DOCUMENTS

| | | | | |
|---|---|---|---|---|
| 2,807,799 | A * | 9/1957 | Rosenthal | 345/697 |
| 2008/0278424 | A1 | 11/2008 | Kim et al. | |
| 2009/0027578 | A1 * | 1/2009 | You et al. | 349/39 |

FOREIGN PATENT DOCUMENTS

| | | |
|---|---|---|
| KR | 100219504 | 6/1999 |
| KR | 1020090048823 | 5/2009 |

* cited by examiner

*Primary Examiner* — Charles V Hicks

(74) *Attorney, Agent, or Firm* — H.C. Park & Associates, PLC

(57) ABSTRACT

A display device includes a first display panel facing a second display panel with a liquid crystal layer between them. The first display panel has a first gate line, a second gate line spaced apart from the first gate line, a first and second storage lines both spaced apart from the first gate line, first and second switching elements controlled by a first gate signal applied through the first gate line, a first sub-pixel electrode connected to the first switching element, a second sub-pixel electrode connected to the second switching element, a third switching element controlled by a second gate signal applied through the second gate line, and a coupling electrode connected to the third switching element and having a portion overlapping the second storage line. Different voltages are applied to the first storage line and the second storage line.

29 Claims, 9 Drawing Sheets

DISPLAY DEVICE

CROSS REFERENCE TO RELATED APPLICATION

This application claims priority from and the benefit of Korean Patent Application No. 10-2010-0075588, filed on Aug. 5, 2010, which is hereby incorporated by reference for all purposes as if fully set forth herein.

BACKGROUND OF THE INVENTION

1. Field of the Invention

Exemplary embodiments of the present invention relate to a display device.

2. Discussion of the Background

The advent of a today's information-oriented society has led to an increasing importance of electronic display devices. For example, various types of the electronic display devices are used in a wide variety of industrial applications. Additionally, there is a trend toward slim, lightweight display devices that implement low-voltage, low-power consumption electronics. Flat-panel display (FPD) devices are well-suited to these applications since they may be relatively small and light weight and may use low driving voltage with low power consumption.

Liquid crystal displays (LCDs) are a widely used type of FPD. An LCD includes two display panels with field-generating electrodes that include pixel electrodes and a common electrode with a liquid crystal layer interposed between the two display panels. The electric field formed by applying voltages to the electrodes aligns the liquid crystal molecules to control the polarization of light passing through the liquid crystal layer. Ultimately, an exit polarizing sheet may transmit light having a narrow range of polarizations, and, in this way, the LCD may display an image.

However, an LCD may have a low viewing angle, e.g., one-tenth of the display's contrast ratio, as compared to a self-emissive display panel. To compensate for the LCD's limited viewing angle, a vertically aligned (VA) mode LCD panel may be configured into one of the following display types: (a) a patterned VA (PVA) mode LCD panel having cutout patterns on upper and lower panel electrodes, (b) a multi-domain VA (MVA) mode LCD panel having protrusion patterns on upper and lower panel electrodes, or (c) a mixed VA mode LCD panel having a cutout pattern on a lower panel electrode and a protrusion pattern on an upper panel electrode.

These LCDs may have color sensitivity variations along different viewing angles (i.e., viewing directions) because red, green, and blue colors produced by pixels may have different gamma grayscale variations according to the viewing direction. Thus, when the respective colors are combined to produce one color, they may differ in color sensitivity according to the viewing direction.

To solve this problem, a pixel electrode may be divided into a main pixel electrode and sub-pixel electrodes for different grayscales. To apply different pixel voltages, switching elements may be connected to the main pixel electrode and the sub-pixel electrodes, or a separate capacitor may be provided between the switching elements and the sub-pixel electrodes. An efficient implementation of this configuration where different voltages are applied to the main pixel electrode and the sub-pixel electrodes is desired.

SUMMARY OF THE INVENTION

Exemplary embodiments of the present invention provide a display device having an improved display quality.

Additional features of the invention will be set forth in the description which follows, and in part will be apparent from the description, or may be learned by practice of the invention.

An exemplary embodiment of the present invention discloses a display device that comprises a first display panel; a second display panel facing the first display panel; and a liquid crystal layer interposed between the first display panel and the second display panel. The first display panel comprises a first gate line extending in a first direction; a second gate line spaced apart from the first gate line and extending in the first direction; a first storage line spaced apart from the first gate line and extending in the first direction; a second storage line spaced apart from the first gate line and extending in the first direction; a first switching element and a second switching element both configured to receive a first gate signal from the first gate line; a first sub-pixel electrode connected to the first switching element; a second sub-pixel electrode connected to the second switching element; a third switching element configured to receive a second gate signal from the second gate line; and a coupling electrode connected to the third switching element and partially overlapping the second storage line. The first storage line is configured to receive a first voltage, and the second storage line is configured to receive a second voltage, which is different than the first voltage.

An exemplary embodiment of the present invention also discloses a display device that comprises a first display panel; a second display panel facing the first display panel and comprising a common electrode; and a liquid crystal layer interposed between the first display panel and the second display panel. The first display panel comprises a first gate line and a second gate line spaced apart from each other; a first switching element and a second switching element both configured to receive a first gate signal from the first gate line; a third switching element configured to receive a second gate signal from the second gate line and connected to a signal line; a first sub-pixel electrode connected to the first switching element; a second sub-pixel electrode connected to the second switching element; and a coupling electrode connected to the third switching element. The second sub-pixel electrode overlaps the coupling electrode.

An exemplary embodiment of the present invention additionally discloses a display device that comprises a first display panel. The first display panel comprises a first gate line; a second gate line spaced apart from the first gate line; a storage line spaced apart from the first gate line and the second gate line; a first switching element and a second switching element both configured to receive a first gate signal from the first gate line; a third switching element configured to receive a second gate signal from the second gate line; a first sub-pixel electrode connected to the first switching element; a second sub-pixel electrode connected to the second switching element; and a coupling electrode connected to the third switching element and partially overlapping the storage line.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
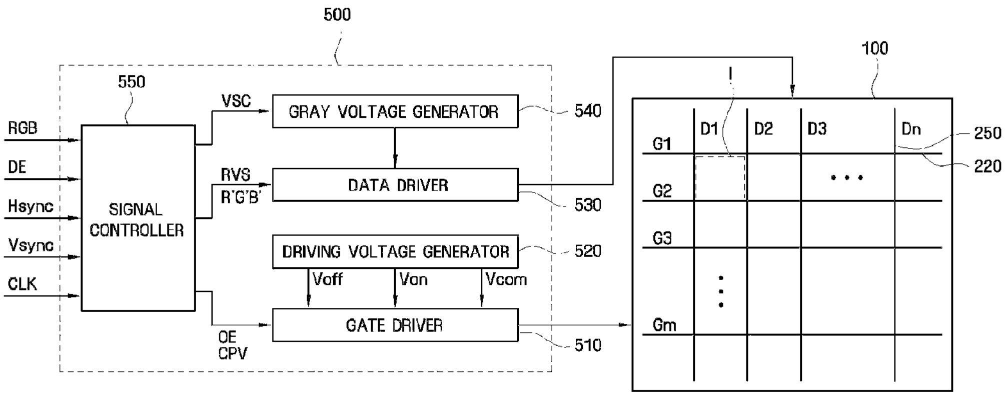
FIG. 1 is a block diagram of a display device according to an exemplary embodiment of the present invention.

The invention is described more fully hereinafter with reference to the accompanying drawings in which embodiments of the invention are shown. This invention may, however, be embodied in many different forms and should not be construed as limited to the embodiments set forth herein. Rather, these embodiments are provided so that this disclosure is thorough and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on," "connected to," or "coupled to" another element or layer, it can be directly on, directly connected to, directly coupled to the other element or layer, or intervening elements or layers may be present. In contrast, when an element is referred to as being "directly on," "directly connected to," or "directly coupled to" another element or layer, there are no intervening elements or layers present.

Spatially relative terms, such as "below," "beneath," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures.

Embodiments described herein will be described referring to plan views and/or cross-sectional views by way of ideal schematic views of the invention. Accordingly, the exemplary views may be modified depending on manufacturing technologies and/or tolerances. Therefore, the exemplary embodiments of the invention are not limited to those shown in the views, but include modifications in configuration formed on the basis of manufacturing processes. Therefore, regions exemplified in figures have schematic properties and shapes of regions shown in figures exemplify specific shapes of regions of elements and not limit aspects of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

A liquid crystal display according to an exemplary embodiment of the present invention is described below with reference to FIG. 1, FIG. 2, FIG. 3, FIG. 4, FIG. 5, FIG. 6, FIG. 7, and FIG. 8.

FIG. 1 is a block diagram of a display device according to an exemplary embodiment of the present invention.

The display device includes a display panel 100 and a panel driver 500. A plurality of pixels I arranged in a matrix format may be formed on the display panel 10. The display panel 100 may be, for example, a liquid crystal panel, and may include a first display panel, a second display panel, and a liquid crystal layer interposed between the first and second display panels. The panel driver 500 may include a gate driver 510, a driving voltage generator 520, a data driver 530, a gray voltage generator 540, and a signal controller 550 that drives these elements.

The driving voltage generator 520 may generate a gate-on voltage Von that turns on switching elements T1, T2, and Tc, a gate-off voltage Voff that turns off the switching elements T1, T2, and Tc, and a common voltage Vcom that is applied to a common electrode. The gray voltage generator 540 may generate a plurality of gray scale voltages associated with brightness of the display device.

The gate driver 510, connected to the gate lines G1 to Gm, applies gate signals (e.g., a combination of a gate-on voltage Von and a gate-off voltage Voff) to the gate lines G1 to Gm.

The data driver 530 receives grayscale voltages from the grayscale voltage generator 540 and applies a grayscale voltage selected according to the operation of the signal controller 550 to a data line, i.e., at least one of data lines D1 to Dn.

The signal controller 550 receives input image signals R, G, and B and input control signals for controlling the display from an external graphics controller (not shown). Examples of the input control signals include a vertical synchronization signal Vsync, a horizontal synchronization signal Hsync, a main clock signal CLK, and a data enable signal DE. The signal controller 550 may generate a gate control signal, a data control signal, and a voltage selection control signal VSC based on the control input signals. The gate control signal includes a vertical synchronization start signal STV for indicating the scanning start of the gate-on pulse (a high period of a gate signal) and a gate clock signal for controlling an output time of the gate-on pulse. The gate control signal may also include an output enable signal OE for defining a duration time of the gate-on pulse. The data control signal includes a horizontal synchronization start signal STH for indicating input start of gray scale signals, a load signal LOAD or TP for instructing application of corresponding data voltages to the data lines, a reverse signal RVS for inverting a polarity of the data voltage with respect to the common voltage Vcom, and a data clock signal HCLK.

A pixel I is a unit for displaying primary colors. In general, a unit pixel represents a color, e.g., red, blue, or green. For example, the pixel I may be defined by a region surrounded by data lines and gate lines but is not limited thereto. In some exemplary embodiments, the pixel I may also be a region surrounded by data lines and storage lines or a region surrounded by data lines, a single gate line, and a single storage line.

Figure 2:
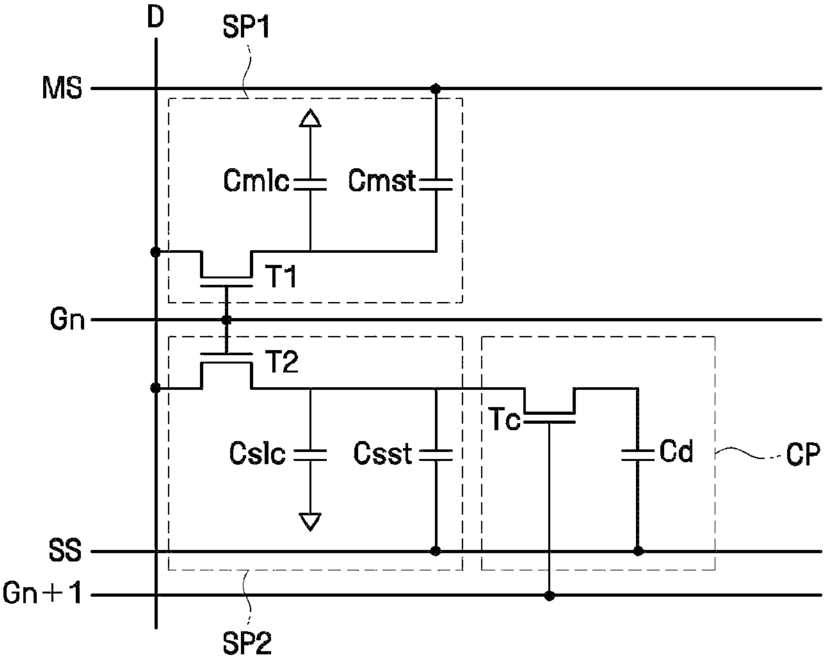
FIG. 2 is an equivalent circuit diagram of a pixel used in a display device according to an exemplary embodiment of the present invention.

FIG. 2 is an equivalent circuit diagram of a pixel used in a display device according to an exemplary embodiment of the present invention.

Referring to FIG. 2, the pixel is connected to a first gate line Gn, a second gate line Gn+1 and a data line D. The pixel includes a first sub-pixel SP1, a second sub-pixel SP2, and a control portion CP. The two gate lines Gn and Gn+1 are adjacently disposed to each other, and the second gate line Gn+1 may be positioned at a rear end of the first gate line Gn. That is to say, after a gate voltage is applied to the first gate line Gn, the gate voltage may be applied to the second gate line Gn+1. Although FIG. 2 shows the first gate line Gn and the second gate line Gn+1 arranged in sequence, the second gate line may be a rear-end gate line positioned two or more gate lines after the first gate line or a dedicated gate line for controlling a third switching element Tc. In the following, for convenience of description, the first gate line Gn is referred to as a main gate line, and the second gate line Gn+1 is referred to as a down gate line. The second gate line Gn+1 may be a rear end gate line or a gate line for controlling rear gate lines positioned at a rear end of the first gate line or a third switching element Tc.

Specifically, the first sub-pixel SP1 includes a first liquid crystal capacitor Cmlc, a first storage capacitor Cmst, and a first switching element T1. Here, the first switching element T1 has a control part connected to the main gate line Gn, an input part connected to the data line D, and an output part connected to the first liquid crystal capacitor Cmlc and the first storage capacitor Cmst. The first storage capacitor is also connected to a main storage line MS.

The second sub-pixel SP2 includes a second liquid crystal capacitor Cslc, a second storage capacitor Csst, and a second switching element T2. Here, the second switching element T2 has a control part connected to the main gate line Gn, an input part connected to the data line D, and an output part connected to the second liquid crystal capacitor Cslc and the second storage capacitor Csst. The second storage capacitor Csst is also connected to a second storage line SS.

The control portion CP includes a down capacitor Cd, and a third switching element Tc. Here, the third switching element Tc has a control part connected to the down gate line Gn+1, an input part connected to the output part of the second switching element T2, and an output part connected to the down capacitor Cd. Therefore, the third switching element Tc is turned on when a gate voltage is applied to the down gate line Gn+1. As a result, the second liquid crystal capacitor Cslc, the second storage capacitor Csst, and the down capacitor Cd may accumulate the same charge level when the third switching element Tc is turned on. Consequently, the voltage of the second liquid crystal capacitor Cslc may be changed.

Figure 3:
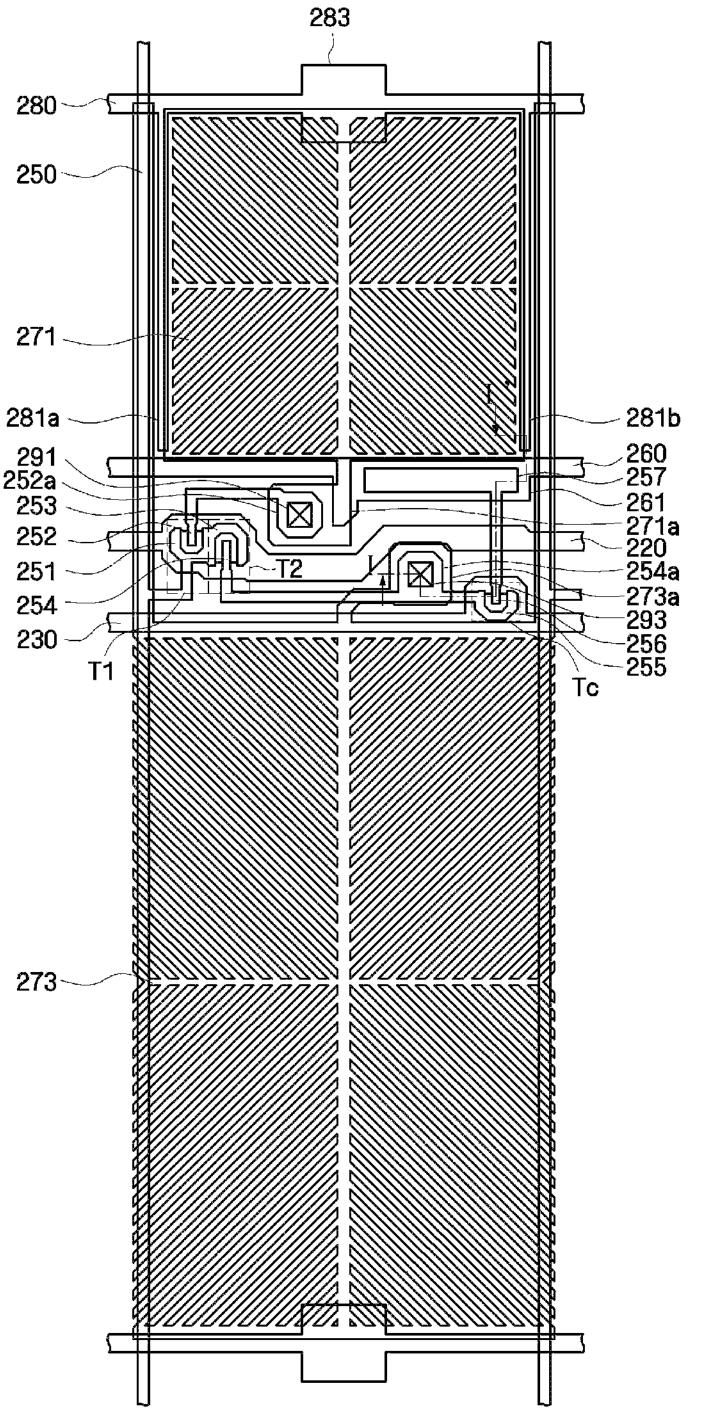
FIG. 3 is a layout view of the display device shown in FIG. 2.
Figure 4:
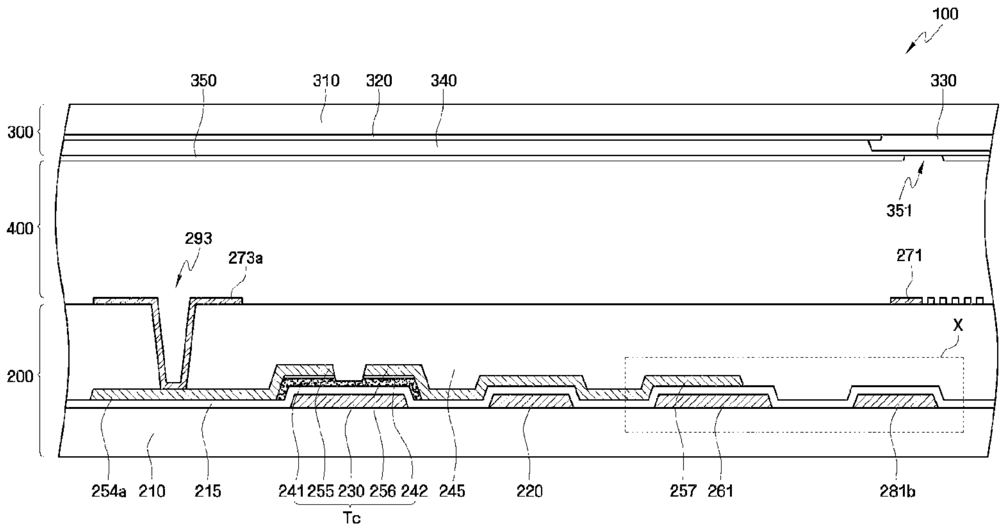
FIG. 4 is a cross-sectional view taken along line I-I' of FIG. 3.
Figure 5:
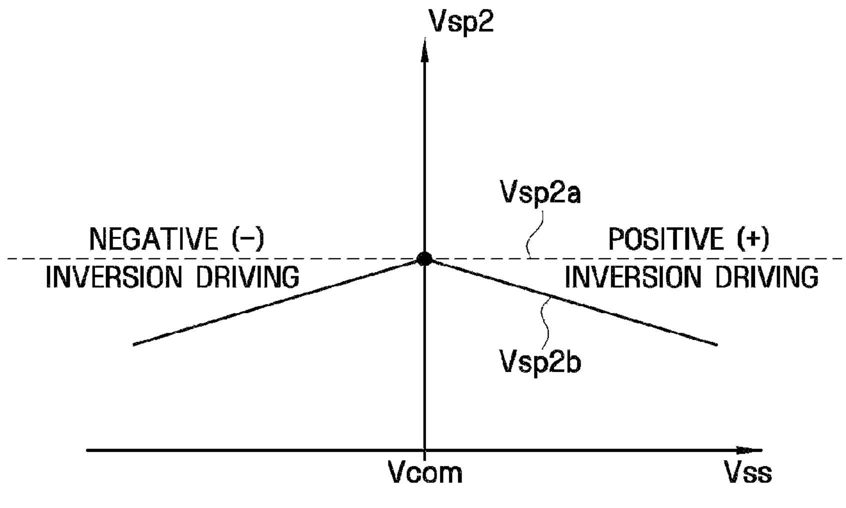
FIG. 5 is a graph showing a voltage change of a second storage line in the display device shown in FIG. 2.

FIG. 3 is a layout view of the display device shown in FIG. 2. FIG. 4 is a cross-sectional view taken along line I-I' of FIG. 3, and FIG. 5 is a graph showing a voltage change of a second storage line in the display device shown in FIG. 2.

Referring to FIG. 3 and FIG. 4, as described above, a pixel includes three switching elements T1, T2, and Tc. The first switching element T1 drives a first sub-pixel electrode 271. The second switching element T2 drives a second sub-pixel electrode 273, and the third switching element Tc changes a voltage applied to the second sub-pixel electrode 273. In other words, the first switching element T1 is electrically connected to the first sub-pixel electrode 271; the second switching element T2 is electrically connected to the second sub-pixel electrode 273, and the third switching element Tc is electrically connected to a coupling electrode 257. Here, the coupling electrode 257 has at least a portion overlapping the second storage lines 260.

The display device may include a first display panel 200 including pixel electrodes 271 and 273, a second display panel 300 facing the first display panel 200 and including a common electrode 350, and a liquid crystal layer 400 interposed between the first display panel 200 and the second display panel 300.

The first display panel 200 includes a main gate line 220, a down gate line 230, first storage lines 280, 283, 281*a*, and 281*b*, and second storage lines 260 and 261 formed on a substrate 210. The substrate 210 may be, for example, a glass substrate such as soda lime glass or borosilicate glass, or a plastic substrate.

The main gate line 220, the down gate line 230, the first storage line 280 and the second storage lines 260 are separated from each other, and extend in a first direction, for example, in a transverse direction. The first storage lines 280, 283, 281*a*, and 281*b* and the second storage lines 260 and 261 overlap the first and second sub-pixel electrodes 271 and 273, respectively, to form a capacitor. Here, different voltages are applied to the first storage lines 280, 283, 281*a* and 281*b*, and the second storage lines 260 and 261.

As shown in FIG. 4, the main gate line 220, the down gate line 230, the first storage lines 280, 283, 281*a* and 281*b*, and the second storage lines 260 and 261 may be formed in the same level. The phrase "formed in the same level" means formed using the same material and by the same process. Thus, the main gate line 220, the down gate line 230, the first storage lines 280, 283, 281*a* and 281*b*, and the second storage lines 260 and 261 may be made of the same material. However, in some cases, the main gate line 220, the down gate line 230, the first storage lines 280, 283, 281*a* and 281*b*, and the second storage lines 260 and 261 may also be formed in different levels. For example, an insulation layer may be interposed between the main gate line 220 and the second storage lines 260 and 261.

The main gate line 220, the down gate line 230, the first storage lines 280, 283, 281*a* and 281*b*, and the second storage lines 260 and 261 may have a metallic single- or multi-layered structure. For example, the main gate line 220, the down gate line 230, the first storage lines 280, 283, 281*a* and 281*b*, and the second storage lines 260 and 261 may contain an aluminum-based metal such as aluminum (Al) and an aluminum alloy, a silver-based metal such as silver (Ag) and a silver alloy, a copper-based metal such as copper (Cu) and a copper alloy, a molybdenum-based metal such as molybdenum (Mo) and a molybdenum alloy, a manganese-based metal such as manganese (Mn) and a manganese alloy, chromium (Cr), titanium (Ti), or tantalum (Ta). In addition, the main gate line 220, the down gate line 230, the first storage lines 280, 283, 281*a* and 281*b*, and the second storage lines 260 and 261 may have a multi-layered structure including two conductive layers (not shown) having different physical properties. One of the two conductive layers is made of a metal having low resistivity, for example, an aluminum-based metal, a silver-based metal, and a copper-based metal, to reduce signal delay or voltage drop of the main gate line 220, the down gate line 230, the first storage lines 280, 283, 281*a* and 281*b*, and the second storage lines 260 and 261. Other conductive layers may have a material having good contact characteristics to other materials, particularly to ZnO (zinc oxide), ITO (indium tin oxide), and IZO (indium zinc oxide), such as a molybdenum-based metal, chromium, titanium, and tantalum. Exemplary combinations for the multi-layered structures include a lower chromium layer and an upper aluminum layer, a lower aluminum layer and an upper molybdenum layer, a lower CuMn alloy layer and an upper copper layer, and a lower titanium layer and an upper copper layer. However, the examples provided here are not limiting, and the main gate line 220, the down gate line 230, the first storage lines 280, 283, 281*a* and 281*b*, and the second storage lines 260 and 261 may be made of various other metals and conductive materials not listed.

As shown in FIG. 3, the main gate line 220, the down gate line 230, and the second storage lines 260 may be disposed between the first sub-pixel electrode 271 and the second sub-pixel electrode 273. In other words, the main gate line 220, the down gate line 230, and the second storage lines 260 and 261 are disposed to be adjacent to each other while being separated from each other. The first sub-pixel electrode 271 may be disposed between the first storage lines 280, 283, 281*a*, and 281*b* and an area where the main gate line 220, the down gate line 230, and the second storage lines 260 and 261 are formed. Alternatively, the second sub-pixel electrode 273 may be disposed between the first storage lines 280, 283, 281*a* and 281*b* and the area where the main gate line 220, the down gate line 230, and the second storage lines 260 and 261 are formed.

The first storage lines 280, 283, 281*a*, and 281*b* may include sub-storage lines 281*a* and 281*b* branched from the first storage line 280 and extending in a second direction different from the first direction, for example, in a longitudinal direction. Here, the sub-storage lines 281*a* and 281*b* may have portions overlapping the first sub-pixel electrode 271 but not overlapping the second sub-pixel electrode 273. As described above, since the first storage lines 280, 283, 281*a*, and 281*b* may be formed spaced apart from the second storage lines 260 and 261, they may also extend with a separation from each other. Further, different voltages may be applied to the first storage lines 280, 283, 281*a*, and 281*b* and the second storage lines 260 and 261.

A gate insulation layer 215 covering the main gate line 220, the down gate line 230, the first storage lines 280, 283, 281*a*, and 281*b* and the second storage lines 260 and 261 are formed on the substrate 210. The gate insulation layer 215 may be made of an inorganic insulating material (e.g., silicon oxide (SiOx), benzocyclcobutene (BCB), an acryl-based material) or an organic insulating material such as polyimide.

A semiconductor layer 241 that may be made of hydrogenated amorphous silicon or polysilicon is formed above the gate insulation layer 215 over the main gate electrode of the main gate line 220. An ohmic contact layer 242 is formed on the semiconductor layer 241 and may be made of a silicide or an n+ hydrogenated amorphous silicon or the like, which may be doped at various levels with n-type impurities.

Data wire (250, 251, 252, 253, 254, 255, 256, and 257) is formed on the gate insulation layer 215, the semiconductor layer 241, and the ohmic contact layer 242. The data wire (250, 251, 252, 253, 254, 255, 256, and 257) may also have a metallic single- or multi-layered structure. For example, the data wire (250, 251, 252, 253, 254, 255, 256, and 257) may have a single layer made of Ni, Co, Ti, Ag, Cu, Mo, Al, Be, Nb, Au, Fe, Se, Mn, or Ta or a multi-layered structure including multiple conductive layers. Examples of the multi-layered structure including multiple conductive layers may include a double-layered structure such as Ta/Al, Ta/Al, Ni/Al, Co/Al, Mo(Mo alloy)/Cu, Mo(Mo alloy)/Cu, Ti(Ti alloy)/Cu, TiN(TiN alloy)/Cu, Ta(Ta alloy)/Cu, TiOx (titanium oxide)/Cu, Al/Nd, Mo/Nb, Mn(Mn alloy)/Cu, or the like.

The data wire (250, 251, 252, 253, 254, 255, 256, and 257) extending in a longitudinal direction may include a data line 250 crossing the main gate line 220, the down gate line 230, and the second storage lines 260 to define a pixel I; source electrodes 251, 253, and 255; and drain electrodes 252, 254, and 256 separated from the source electrodes 251, 253, and 255 and formed opposite to the source electrodes 251, 253, and 255. Further, a coupling electrode 257 may be connected to a third drain electrode 256 to be described later.

More specifically, the data wire (250, 251, 252, 253, 254, 255, 256, and 257) may constitute first, second, and third switching elements T1, T2, and Tc together with the main gate line 220 and the down gate line 230.

The first switching element T1 may include a first source electrode 251 having at least a portion overlapping the main gate line 220 and connected to the data line 250, and a first drain electrode 252 having at least a portion overlapping the main gate line 220 and separated from the first source electrode 251. The second switching element T2 may include a second source electrode 253 having at least a portion overlapping the main gate line 220 and connected to the first source electrode 251, and a second drain electrode 254 having at least a portion overlapping the main gate line 220 and separated from the second source electrode 253. Likewise, the third switching element Tc may include a third source electrode 255 having at least a portion overlapping the down gate line 230 and connected to the second drain electrode 254, and a third drain electrode 256 having at least a portion overlapping the down gate line 230 and separated from the third source electrode 255.

If a main gate signal is applied through the main gate line 220, the first and second switching elements T1 and T2 respectively including the source electrodes 251 and 253 and the drain electrodes 252 and 254 having at least portions overlapping the main gate line 220 are controlled by the main gate signal. Likewise, if a down gate signal is applied through the down gate line 230, the third switching element Tc including the source electrode 255 and the drain electrode 256 having at least portions overlapping the down gate line 230 are controlled by the down gate signal. As described above, if the third switching element Tc is turned on by the down gate signal, the voltage charged to the second liquid crystal capacitor Cslc may be changed.

The first drain electrode 252 may be electrically connected to the first sub-pixel electrode 271 through a contact hole 291, and the second drain electrode 254 may be electrically connected to the second sub-pixel electrode 273 through a contact hole 293. In order to establish an electrical connection in a stable manner, as shown, the first sub-pixel electrode 271 and the second sub-pixel electrode 273 may include pad portions 271*a* and 273*a*, respectively. The first drain electrode 252 and the second drain electrode 254 may also include pad portions 252*a* and 254*a*, respectively.

A protective layer 245 may be formed on the data wire (250, 251, 252, 253, 254, 255, 256, and 257). The contact holes 291 and 293 may be formed in the protective layer 245. The protective layer 245 according to the exemplary embodiment may be formed of an organic film, an inorganic film, or a multi-layered film including an organic film and an inorganic film. For example, although not shown, the protective layer 245 may include an inorganic layer formed along the profiles of the data wire (250, 251, 252, 253, 254, 255, 256, and 257) and the gate insulation layer 215, and an organic layer formed on the inorganic layer. The organic layer may be made of a material having an excellent planarization property.

A pixel electrode (271 and 273) may be formed on the protective layer 245. The pixel electrode (271 and 273) may be generally made of a transparent conductive material such as ITO (indium tin oxide) or IZO (indium zinc oxide). The pixel electrode (271 and 273) includes a first sub-pixel electrode 271 electrically connected to the first drain electrode 252 and a second sub-pixel electrode 273 electrically connected to the second drain electrode 254. As shown, the first and second sub-pixel electrodes 271 and 273 may include slit patterns.

As described above, an overlapping area of the second storage lines 260 and the coupling electrode 257 forms a down capacitor Cd. That is to say, the overlapping area may reduce a charge voltage of the second sub-pixel electrode 273. Here, the capacitance of the down capacitor Cd can be controlled by adjusting the voltage applied to the second storage lines 260. A change in the voltage applied to the second sub-pixel electrode 273 depending on the voltage applied to the second storage lines 260 is described below with reference to FIG. 5.

As shown in FIG. 3 and FIG. 4, the second storage lines 260 may include a pad portion 261 with a wide section overlapping the coupling electrode 257. The second storage line pad portion 261 and the coupling electrode 257 form the down capacitor Cd, thereby reducing the charge voltage of the second sub-pixel electrode 273.

Further, the second storage lines 260 is separated from the first storage lines 280, 283, 281*a*, and 281*b*. The sub-storage lines 281*a* and 281*b* of the first storage line 280 may at least partially overlap the first sub-pixel electrode 271. The first storage lines 280, 283, 281*a*, and 281*b* may include two or more sub-storage lines 281*a* and 281*b* that may be formed in the vicinity of the data line 250 to overlap the first sub-pixel electrode 271.

As shown, the first storage lines 280, 283, 281*a*, and 281*b*, including the sub-storage lines 281*a* and 281*b*, may have a π-shape along the periphery of the first sub-pixel electrode 271. Here, the first storage lines 280, 283, 281*a*, and 281*b* may not overlap the second sub-pixel electrode 273. However, the shapes of the first storage lines 280, 283, 281*a*, and 281*b* are provided for illustration only, and the shapes of the sub-storage lines 281*a* and 281*b* may vary according to the shape of the first sub-pixel electrode 271.

The first storage lines 280, 283, 281*a*, and 281*b* are formed to be separated from the second storage lines 260. As indicated by the portion of FIG. 4 labeled by the "X", an end portion of the first storage lines 280, 283, 281*a*, and 281*b* is spaced apart from the second storage lines 260 including the pad portion 261. In other words, the first storage lines 280, 283, 281*a*, and 281*b* and the second storage lines 260 are physically and electrically separated from each other.

Accordingly, different voltages are applied to the first storage lines 280, 283, 281*a*, and 281*b* and the second storage lines 260. Although not directly shown, the first storage lines 280, 283, 281*a*, and 281*b* and the second storage lines 260 are formed in a circuit unit (not shown) of the display panel 100 and are connected to first and second voltage wires for applying different voltages. In this way, different pixel voltages are received by the sub-pixel electrodes 271 and 273.

As shown in FIG. 5, the voltage applied to the second storage lines 260 can be changed. In other words, the voltage Vss applied to the second storage lines 260 may be different from the common voltage Vcom applied to the common electrode. As described above, the voltage applied to the second sub-pixel electrode 273 may be changed by the down capacitor Cd, and the stored charge of the down capacitor Cd may be controlled by adjusting the voltage applied to the second storage lines 260. Hence, the voltage level applied to the second sub-pixel electrode 273 may be controlled as a result of capacitive coupling between the second sub-pixel electrode 273 and the second storage lines 260 by the down capacitor Cd.

Referring to FIG. 5, in an exemplary embodiment, assuming that first and second sub-pixel electrodes 271 and 273 are driven by an inversion driving method, the storage voltage Vss applied to the second storage lines 260 may swing between a high level and a low level with respect to a common voltage Vcom. In other words, with respect to the common voltage Vcom, a high-level voltage is applied as the storage voltage Vss in positive (+) inversion driving, and a low-level voltage is applied as the storage voltage Vss in negative (−) inversion driving.

Therefore, the data voltage Vsp2*a* applied to the second sub-pixel electrode 273 before charge sharing occurs by the down capacitor Cd may be changed into a voltage Vsp2*b* once charge accumulation occurs. In addition, the greater the difference between the voltage applied to the second storage lines 260 and the common voltage Vcom, the more the voltage Vsp2*b* of the second sub-pixel electrode 273 after charge accumulation is lowered from the voltage Vsp2*a* of the second sub-pixel electrode 273 before charge sharing amongst the second liquid crystal capacitor Cslc, the second storage capacitor Csst, and the down capacitor Cd.

Referring back to FIG. 4, the second display panel 300 includes a light blocking layer 320 formed on a second substrate 310. The light blocking layer 320 may define regions between red, green, and blue color filters and may serve to prevent light from being directly irradiated into thin film transistors positioned on the first display panel 200. The light blocking layer 320 may include a photosensitive organic material with a black pigment or chromium (Cr) or chromium oxide (CrOx).

A color filter layer 330 may have red, green, and blue color filters repeatedly arranged and surrounded by the light blocking layer 320. The color filter layer 330 serves to transmit certain colors of light originating from a backlight unit (not shown) and passing through the liquid crystal layer 400. The color filter layer 330 may be made of a photosensitive organic material.

An overcoat layer 340 is formed on the color filter 330 and the light blocking layer 320. The overcoat layer 340 serves to protect the color filter layer 330 while planarizing the surface of the second substrate 310 that may have step portions created by height differences between the light blocking layer 320 and the color filter layer 330. The overcoat layer 340 may contain an acryl-based epoxy material but is not limited thereto.

The common electrode 350 is formed over the over-coat layer 340. The common electrode 350 may be made of a transparent conductive material such as ITO (indium tin oxide) or IZO (indium zinc oxide). The common electrode 350 may be biased with a voltage that is different than a voltage applied to the pixel electrode 270 of the first display panel 200 to establish an electric field through the liquid crystal layer 400. In some exemplary embodiments, a common electrode cutout pattern 351 may be formed in the common electrode 350.

In the display device according to the exemplary embodiment of the present invention, the first and second storage lines that are separated from each other may have different voltages applied to them to prevent light leakage or a texture from occurring in the vicinity of a pixel area, such as between areas having different alignments of liquid crystal molecules.

Figure 6:
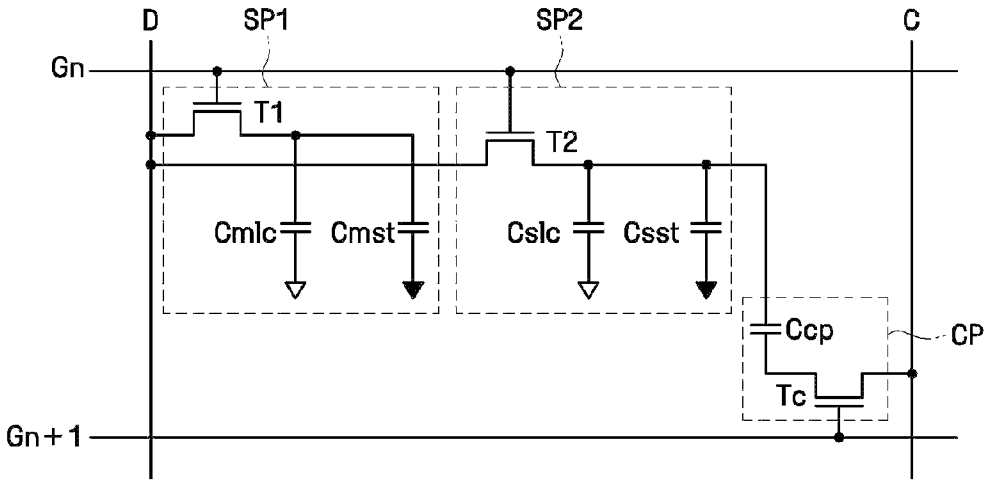
FIG. 6 is an equivalent circuit diagram of a pixel used in a display device according to another exemplary embodiment of the present invention.
Figure 7:
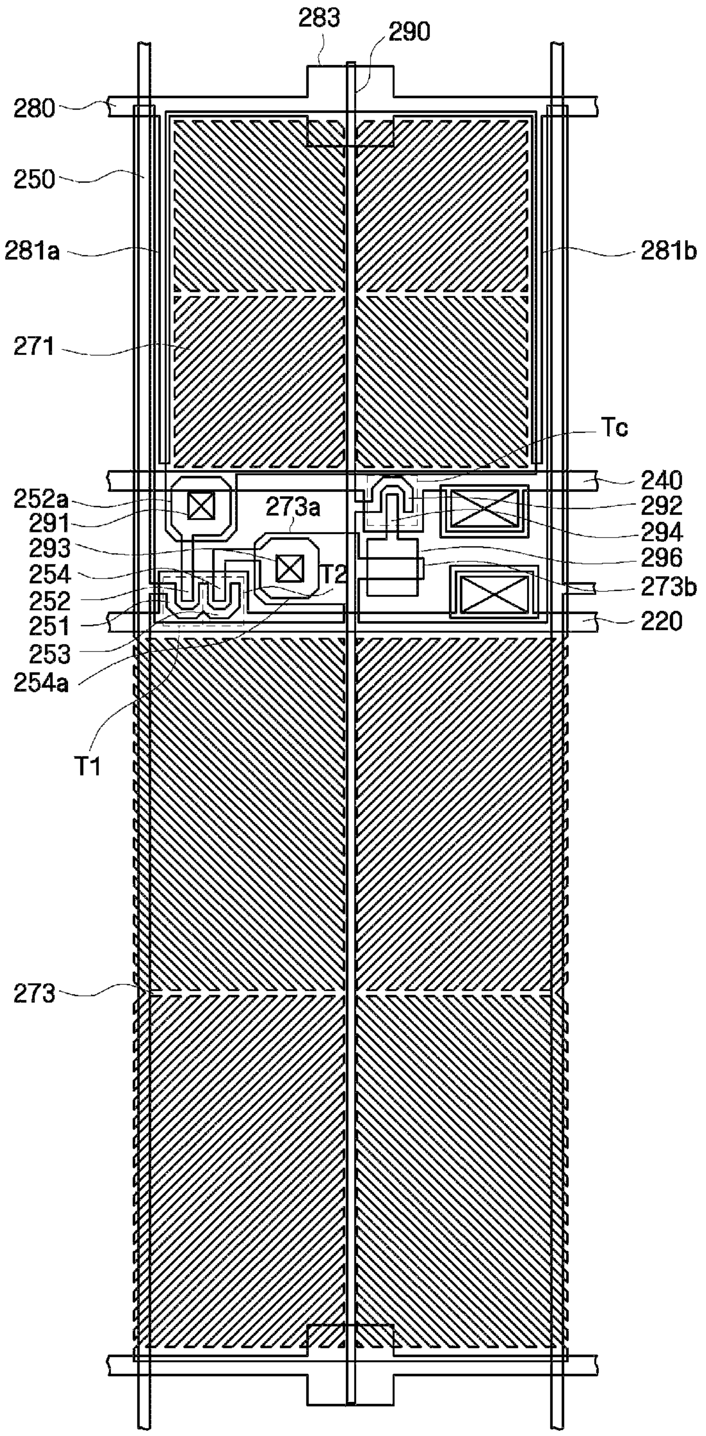
FIG. 7 is a layout view of the display device shown in FIG. 6.

Next, a display device according to another exemplary embodiment of the present invention will be described with reference to FIG. 6 and FIG. 7. FIG. 6 is an equivalent circuit diagram of a pixel in a display device according to another exemplary embodiment of the present invention, and FIG. 7 is a layout view of the display device shown in FIG. 6.

The display device according to the present exemplary embodiment is distinguished from the display device according to the previous exemplary embodiment since the present exemplary embodiment includes a control line connected to a control switching element controlled by a coupling gate signal applied to a coupling gate line. The present exemplary embodiment is described with regard to differences between the two exemplary embodiments, and the same reference numerals denote similar elements in the exemplary embodiments so that repeated descriptions may be omitted.

Referring to FIG. 6 a pixel is connected to first and second gate lines Gn and Gn+1, a data line D, and a control line C. The pixel includes a first sub-pixel SP1, a second sub-pixel SP2, and a control portion CP. The two gate lines Gn and Gn+1 are adjacently disposed to each other. The second gate line Gn+1 may be positioned at a rear end to the first gate line Gn. That is, after a gate voltage is applied to the first gate line Gn, the gate voltage may be applied to the second gate line Gn+1. As in the previous exemplary embodiment, other gates lines may be arranged between the physical locations of the first gate line Gn and the second gate line Gn+1 while maintaining the second gate line Gn+1 at a rear end to the first gate line Gn.

Specifically, the control portion CP includes a control switching element Tc having an input part connected to the control line C, a control part connected to the second gate line Gn+1, and an output part connected to a coupling capacitor Ccp. Here, the coupling capacitor Ccp is constituted by the output part of the control switching element Tc and the output part of the second switching element T2. Although FIG. 6 shows the first gate line Gn and the second gate line Gn+1 arranged in sequence, the second gate line Gn+1 may be a rear-end gate line positioned two or more gate lines behind the first gate line or may be a dedicated gate line. For convenience of description, the first gate line Gn is referred to as a main gate line, and the second gate line Gn+1 is referred to as a down gate line. In addition, the control switching element Tc is referred to as a third switching element, the control line C as a signal line, and the control electrode 296 (shown in FIG. 7) as a coupling electrode.

Referring to FIG. 7, the display device according to the present exemplary embodiment includes a first display panel (200 of FIG. 4), a second display panel (300 of FIG. 4), and a liquid crystal layer (400 of FIG. 4).

The first display panel 200 includes a main gate line 220 formed on a substrate 210, a coupling gate line 240 spaced apart from the main gate line 220, and a control line 290 connected to a control switching element Tc controlled by a coupling gate signal applied to the coupling gate line 240.

The main gate line 220 and the coupling gate line 240 are separated from each other, and extend in a first direction, for example, in a transverse direction. A main gate signal applied through the main gate line 220 controls a first switching element T1 and a second switching element T2.

The coupling gate line 240 controls the control switching element Tc, and the coupling gate signal applied to the coupling gate line 240 may be, for example, a rear-end gate signal.

The first switching element T1 is electrically connected to the first sub-pixel electrode 271, the second switching element T2 is electrically connected to the second sub-pixel electrode 273.

The control line 290 includes a control electrode 296 connected to the control switching element Tc. More specifically, the control switching element Tc may include a control source electrode 292 having at least a portion overlapping the coupling gate line 240 and branched from the control line 290, and a control drain electrode 294 having at least a portion overlapping the coupling gate line 240 and separated from the control source electrode 292. The control electrode 296 may be connected to the control drain electrode 294 and may have an area wider than the control drain electrode 294. In addition, the control electrode 296 overlaps a coupling area **273*b* of the second sub-pixel electrode 273. An overlapping area of the coupling area 273*b* of the second sub-pixel electrode 273 and the control electrode 296 may form a coupling capacitor Ccp that reduces a charge voltage of the second sub-pixel electrode 273. Here, the coupling area 273*b* of the second sub-pixel electrode 273 is an enlarged portion of the second sub-pixel electrode 273, which corresponds to its area overlapping the control electrode 296**.

As shown in FIG. 7, the first display panel 200 includes a plurality of data lines 250 extending in a second direction, for example, in a longitudinal direction, different from a first direction, which may be a transverse direction. A control line 290 is separated from the plurality of data lines 250 and extends in the second direction, for example, in the longitudinal direction.

In an exemplary embodiment, as shown in FIG. 7, the control line 290 is formed between each of the plurality of data lines 250. In addition, the plurality of data lines 250 and the control line 290 may be formed in the same level. Here, the phrase “formed in the same level” means formed using the same material and by the same process. Thus, the control line 290 and the data wire (250, 251, 252, 253, and 254) may be made of the same material and made by the same process.

As in the above exemplary embodiments, the main gate line 220 and the coupling gate line 240 may be disposed between the first sub-pixel electrode 271 and the second sub-pixel electrode 273. A first contact hole 291 and a second contact hole 293 may be disposed in an area between the first sub-pixel electrode 271 and the second sub-pixel electrode 273. The first contact hole 291 may electrically connect the main gate line 220, the coupling gate line 240, the first switching element T1, the second switching element T2, the control switching element Tc, the first switching element T1 and the first sub-pixel electrode 271. The second contact hole 293 may electrically connect the second switching element T2 and the second sub-pixel electrode 273, and a coupling area **273*b* of the second sub-pixel electrode 273 and the control electrode 296** for forming a coupling capacitor Ccp.

As described above, after a coupling gate signal is applied to the coupling gate line 240, a control signal transmitted through the control line 290 is applied to the coupling capacitor Ccp through the control switching element Tc, and a voltage change of the second sub-pixel electrode 273 may be induced by the coupling capacitor Ccp. In this way, since the coupling capacitor Ccp is formed by the coupling area **273*b* of the second sub-pixel electrode 273 and the control electrode 296, the second storage line of the previous exemplary embodiment (260 of FIG. 3) may be omitted. Accordingly, components disposed between the first sub-pixel electrode 271 and the second sub-pixel electrode 273, for example, the main gate line 220, the coupling gate line 240, and the first and second contact holes 291 and 293, may be easily arranged. In addition, since a gap between the first sub-pixel electrode 271 and the second sub-pixel electrode 273** is reduced, an aperture ratio of the display may also be improved.

As shown in FIG. 7, when the control line 290 is disposed between two adjacent data lines 250, the first switching element T1 and the second switching element T2 may be disposed between the control line 290 and one side of the control line 290, for example, between the control line 290 and the left data line 250. The control switching element Tc and the coupling capacitor Ccp may be disposed between the control line 290 and the other side of the control line 290, for example, between the control line 290 and the right data line 250. However, the relative positions of the control line 290 and the data line 250 and spatial arrangements of functional components may be modified in various manners.

In some exemplary embodiments, the control line 290 may extend in the same direction as the main gate line 220 and the coupling gate line 240, for example, in a transverse direction.

Figure 8:
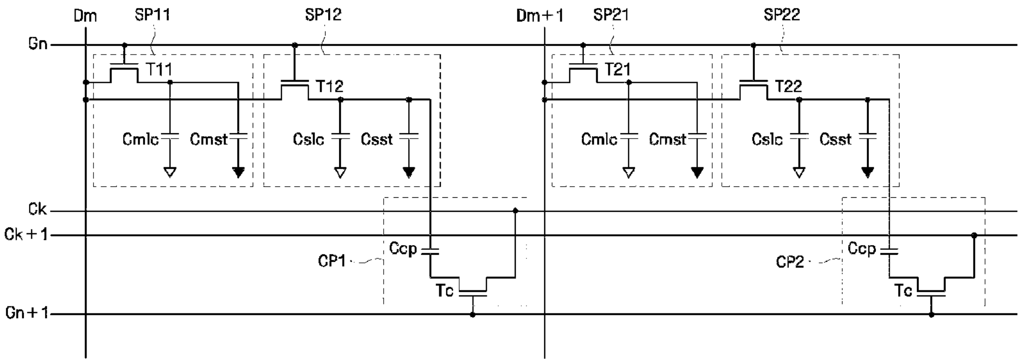
FIG. 8 is an equivalent circuit diagram of a pixel used in a display device according to another exemplary embodiment of the present invention.

FIG. 8 is an equivalent circuit diagram of a pixel used in a display device according to another exemplary embodiment of the present invention.

As shown in FIG. 8, a control line 290 includes a first control line Ck and a second control line Ck+1 spaced apart from each other and extends in a first direction, which is the same as the main gate line Gn and the coupling gate line Gn+1, for example, in a transverse direction.

In addition, a pixel may include a first pixel unit and a second pixel unit each including a first sub-pixel (SP11, SP21), a second sub-pixel (SP21, SP22), and a control portion (CP1, SP2). The control portion CP1 of the first pixel unit may include a control switching element Tc connected to the first control line Ck. The control portion CP2 of the second pixel unit may include a control switching element Tc connected to the second control line Ck+1. Here, a first control signal applied to the first control line Ck and a second control signal applied to the second control line Ck+1 may be complementary signals, i.e., when the first control signal is at a high-level, the second control signal may be at a low-level. Conversely, when the second control signal is at a high-level, the first control signal may be at a low-level.

Figure 9:
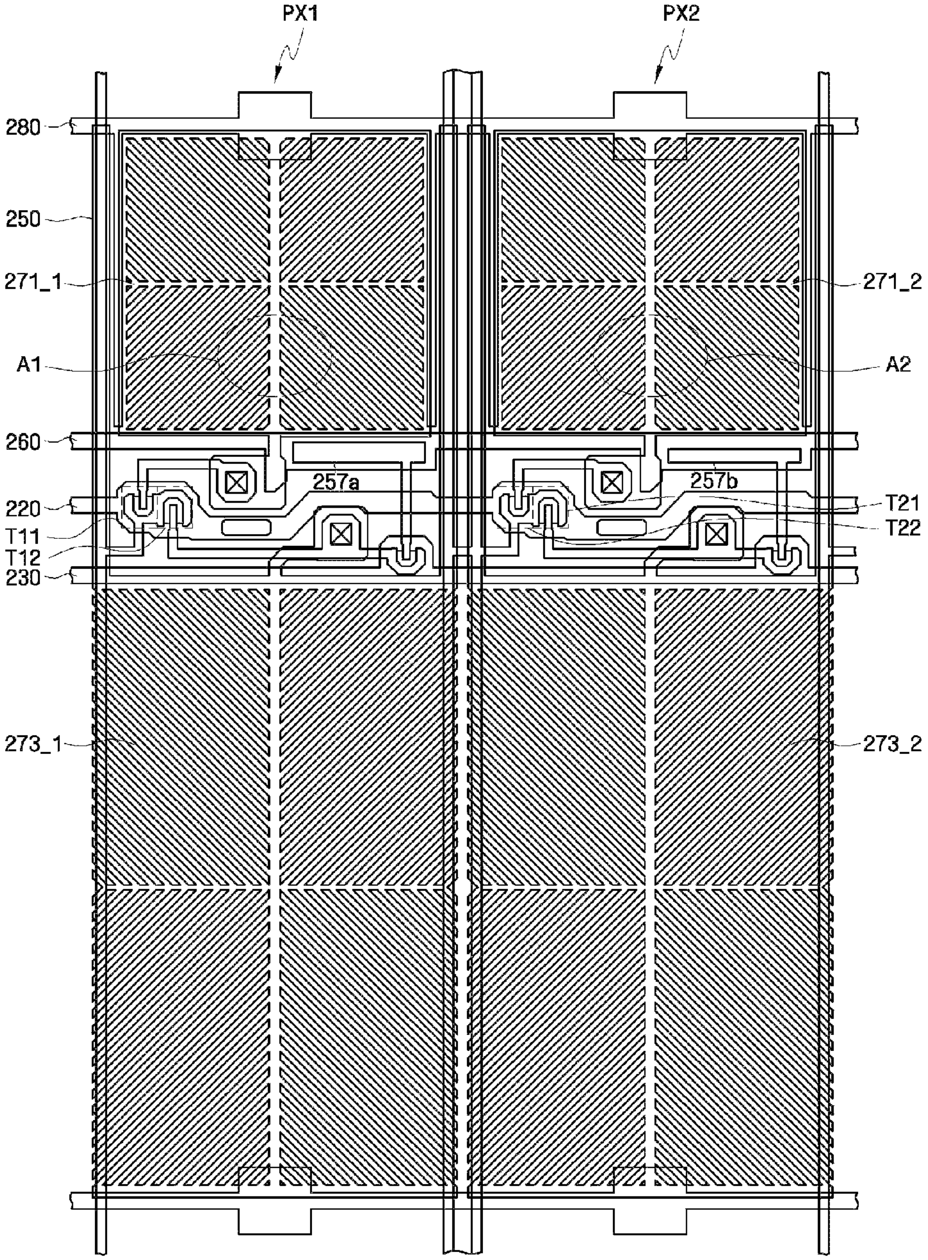
FIG. 9 is a layout view of a display device according to another exemplary embodiment of the present invention.
Figure 10A:
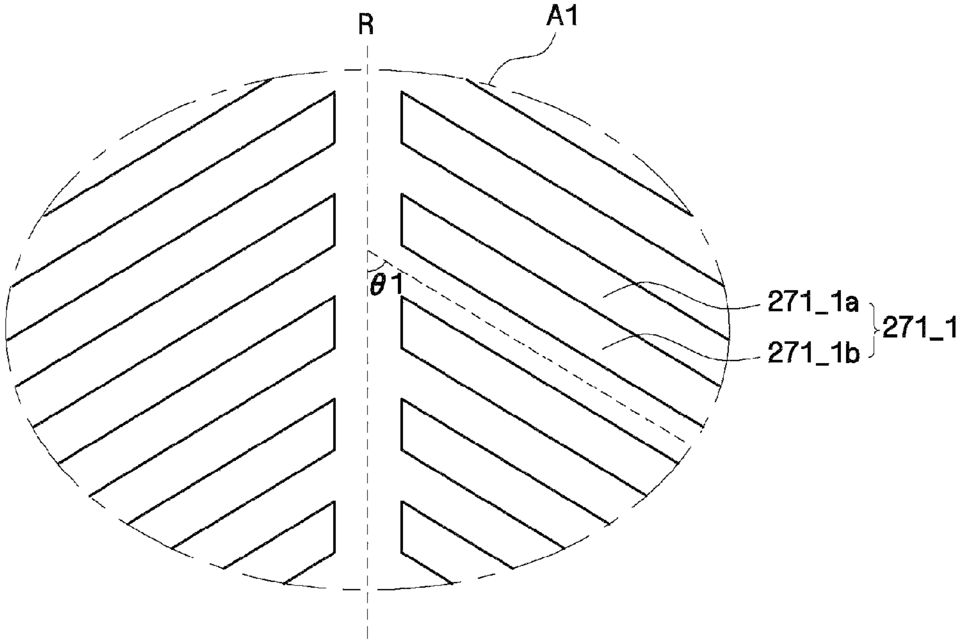
FIG. 10A and FIG. 10B are enlarged views of portions labeled as A1 and A2 in FIG. 9 for explaining a display device according to another exemplary embodiment of the present invention.
Figure 10B:
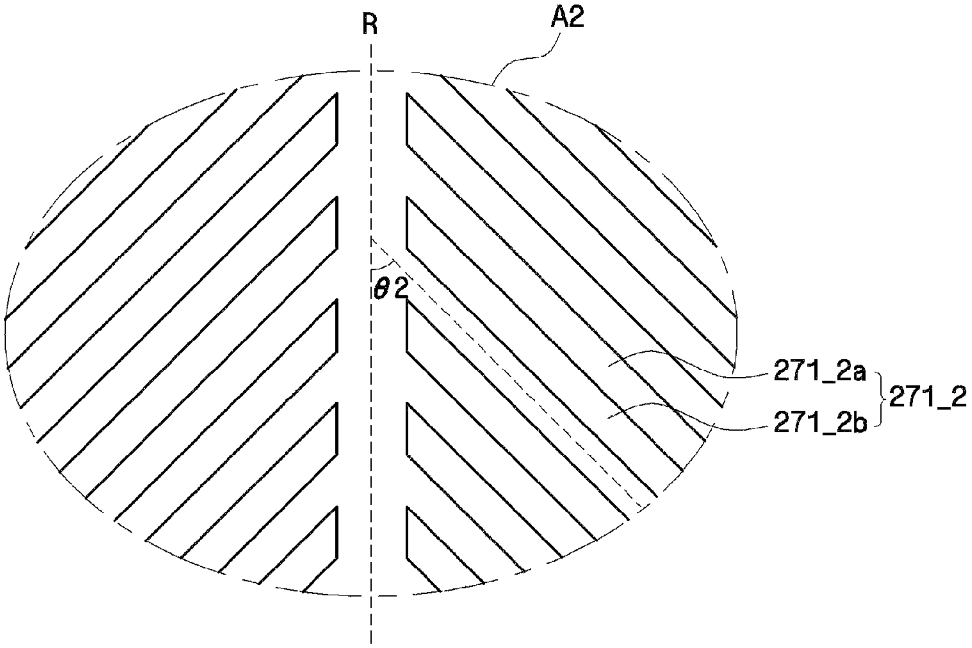
Figure 11A:
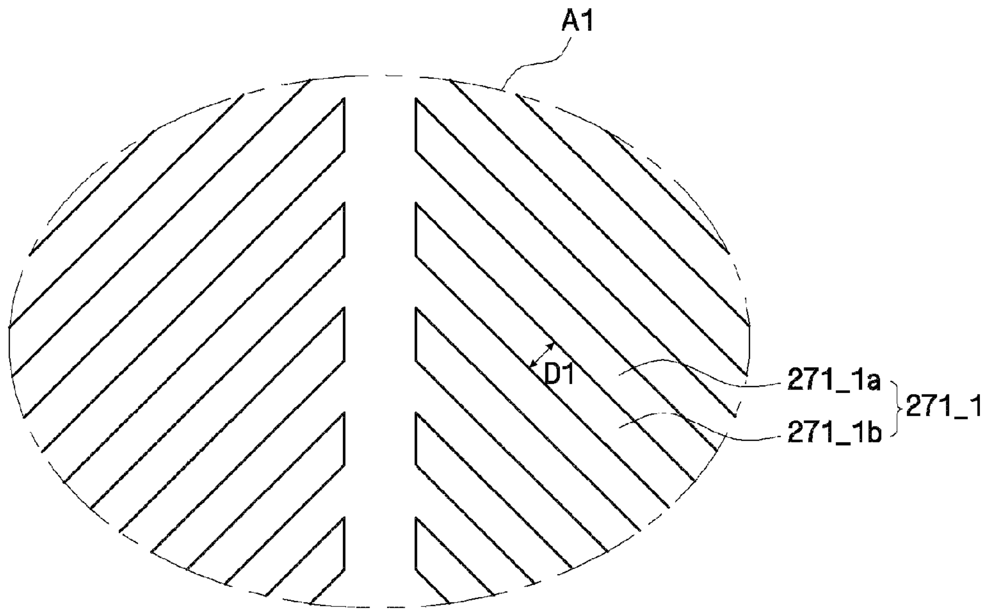
FIG. 11A and FIG. 11B are enlarged views of portions labeled as A1 and A2 in FIG. 9 for explaining a display device according to another exemplary embodiment of the present invention.
Figure 11B:
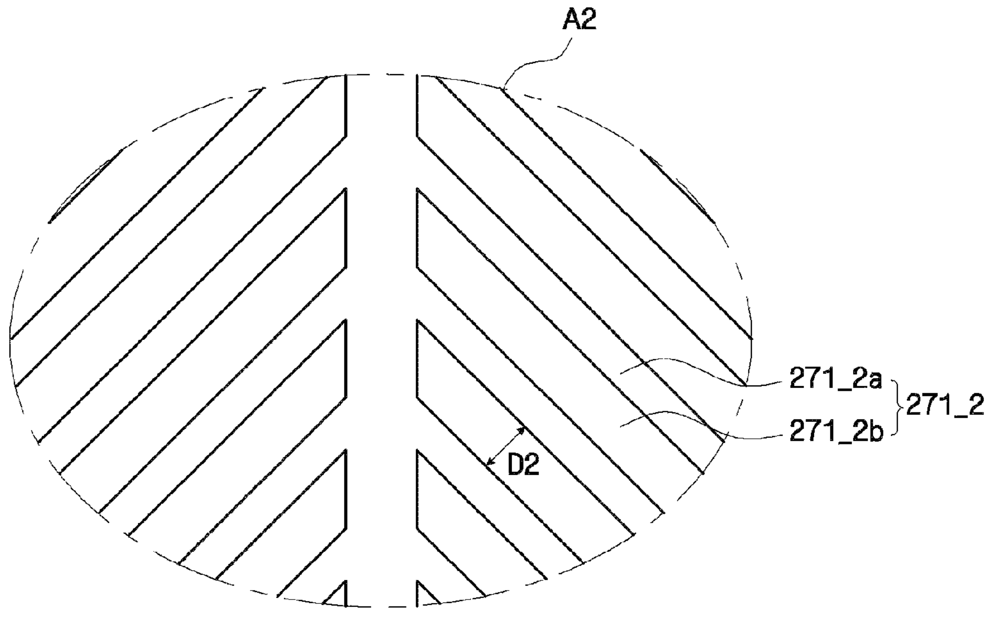

Next, a display device according to another exemplary embodiment of the present invention will be described with reference to FIG. 9, FIG. 10A, FIG. 10B, FIG. 11A, and FIG. 11B. FIG. 9 is a layout view of a display device according to another exemplary embodiment of the present invention. FIG. 10A and FIG. 10B are enlarged views of portions labeled as A1 and A2 in FIG. 9 for explaining a display device according to another exemplary embodiment of the present invention, and FIG. 11A and FIG. 11B are enlarged views of portions labeled as A1 and A2 of FIG. 9 for explaining a display device according to another exemplary embodiment of the present invention.

Referring to FIG. 9, a first display panel (200 of FIG. 4) may include a first pixel unit PX1 and a second pixel unit PX2 each having a first sub-pixel (271_1, 271_2) and a second sub-pixel (273_1, 273_2). The second display panel (300 of FIG. 4) may include a color filter layer (330 of FIG. 4) having red, green, and blue color filters formed thereon. The second display panel 300 may have red or green color filters disposed to correspond to the first pixel unit PX1 and a blue color filter disposed to correspond to the second pixel unit PX2. In some exemplary embodiments, the coupling electrode 257*a* of the first pixel unit PX1 may have a first area, and the coupling electrode 257*b* of the second pixel unit PX2 may have a second area that is greater than the first area.

Referring to FIG. 10A and FIG. 10B, the first sub-pixel electrode 271_1 of the first pixel unit PX1 may include first slit patterns 271_1*a* and 271_1*b* tilted in a first acute angle θ1 with respect to a first direction R, and the first sub-pixel electrode 271_2 of the second pixel unit PX2 may include second slit patterns 271_2*a* and 271_2*b* 1*b* tilted in a second acute angle θ2 with respect to the first direction R. Here, the second acute angle θ2 is smaller than the first acute angle θ1. For example, the second acute angle θ2 may be approximately 35° or less, for example, a range of approximately 30° to 35°. The first acute angle θ1 may be, for example, approximately 40°. Alternatively, the first slit patterns 271_1*a* and 271_1*b* and the second slit patterns 271_2*a* and 271_2*b* may be formed such that the second acute angle θ2 may be approximately 5° or greater than the first acute angle θ1. In this way, brightness of a blue pixel (using a blue color filter on the second display panel in a portion overlapping the second unit pixel PX2) is lowered by reducing the slope of the slit patterns 271_2*a* and 271_2*b* of the second pixel unit PX2 corresponding to the blue color filter. Accordingly, a reddish phenomenon occurring at a low grayscale level can be suppressed.

That is to say, a yellowish phenomenon occurring at a high gray scale level is suppressed by making the second area of the coupling electrode 257*b* of the second pixel unit PX2 having the blue color filter smaller than the first area of the coupling electrode 257*a* of the first pixel unit PX1 having the red or green color filter. Additionally, a reddish phenomenon occurring at a low grayscale level can be suppressed by making the slope of the second slit pattern 271_2*a*, 271_2*b* of the second pixel unit PX2 corresponding to the blue color filter smaller than that of the first slit pattern 271_1*a*, 271_1*b* of the first pixel unit PX1. In other words, the display device according to this exemplary embodiment can suppress both the reddish phenomenon occurring at the low grayscale level and the yellowish phenomenon occurring at the high gray scale level, thereby potentially achieving a better display quality of the display device.

In some exemplary embodiments, as shown in FIG. 11A and FIG. 11B, the first sub-pixel electrode 271_1 of the first pixel unit PX1 may include first slit patterns 271_1*a* and 271_1*b* having a first open portion 271_1*b* and a first electrode portion 271_1*a*, and the first sub-pixel electrode 271_2 of the second pixel unit PX2 may include second slit patterns 271_2*a* and 271_2*b* 1*b* having a second open portion 271_2*b* and a second electrode portion 271_2*a*. Here, a width D2 of the second open portion 271_2*b* may be greater than a width D1 of the first open portion 271_1*b*. As in previous exemplary embodiments, the second display panel 300 may have a red or green color filter disposed to correspond to the first pixel unit PX1 and a blue color filter disposed to correspond to the second pixel unit PX2.

In FIG. 10A and FIG. 10B, to make the brightness of the blue pixel lower than the brightness of the red or green pixel, the slopes of the first slit patterns (271_1*a*, 271_1*b*) and the second slit patterns (271_2*a*, 271_2*b*) may be different. By contrast, in FIG. 11A and FIG. 11B, to make the brightness of the blue pixel lower than the brightness of the red or green pixel, the widths D1 and D2 of the open portions (271_1*b*, 271_2*b*) may be different.

In other words, in some exemplary embodiments of the present invention, as shown in FIG. 11A and FIG. 11B, the yellowish phenomenon occurring at a high gray scale level may be suppressed by forming the coupling electrode 257*b* of the second pixel unit PX2 (corresponding to the blue color filter) to have the second area smaller than the first area of the coupling electrode 257*a* of the first pixel unit PX1 (corresponding to the red or green color filter). In addition, the reddish phenomenon occurring at a low grayscale level may be suppressed by forming the second open portion 271_2*b* of the second slit pattern of the second pixel unit PX2 (corresponding to the blue color filter) to have the width D2 smaller than the width D1 of the first open portion 271_1*b* of the first slit pattern 271_1*b* of the first pixel unit PX1. In other words, the display device according to the present exemplary embodiment may suppress both the reddish phenomenon occurring at the low grayscale level and the yellowish phenomenon occurring at the high gray scale level, thereby potentially achieving a better display quality of the display device.

While the present invention has been particularly shown and described with reference to exemplary embodiments thereof, it will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. A display device, comprising:

a first display panel;

a second display panel facing the first display panel; and a liquid crystal layer interposed between the first display panel and the second display panel, wherein the first display panel comprises:

a first gate line extending in a first direction;

a second gate line spaced apart from the first gate line and extending in the first direction;

a first storage line spaced apart from the first gate line and extending in the first direction;

a second storage line spaced apart from the first gate line and extending in the first direction;

a first switching element and a second switching element both configured to receive a first gate signal from the first gate line;

a first sub-pixel electrode connected to the first switching element;

a second sub-pixel electrode connected to the second switching element;

a third switching element configured to receive a second gate signal from the second gate line; and a coupling electrode connected to the third switching element and partially overlapping the second storage line, wherein the first storage line is configured to receive a first voltage, and the second storage line is configured to receive a second voltage, which is different than the first voltage, and wherein at least one of the first switching element, the second switching element, and the third switching element is disposed between the first sub-pixel electrode and the second sub-pixel electrode.

2. The display device of claim 1, wherein the first gate line, the second gate line, and the second storage line are disposed between the first sub-pixel electrode and the second sub-pixel electrode.

3. The display device of claim 1, wherein the coupling electrode overlaps the second storage line to decrease a voltage of the second sub-pixel electrode.

4. The display device of claim 3, wherein the second storage line is configured to receive the second voltage to decrease the voltage of the second sub-pixel electrode.

5. The display device of claim 4, wherein the first sub-pixel electrode and the second sub-pixel electrode are configured to be driven by an inversion driving method, and the second voltage ranges from a high-level and a low-level with respect to a common voltage.

6. The display device of claim 3, wherein the first switching element comprises a first input electrode at least partially overlapping the first gate line and connected to a data line, and a first output electrode at least partially overlapping the first gate line and spaced apart from the first input electrode, the second switching element comprises a second input electrode at least partially overlapping the first gate line and connected to the first input electrode, and a second output electrode at least partially overlapping the first gate line and spaced apart from the second input electrode, the third switching element comprises a third input electrode at least partially overlapping the second gate line and connected to the second output electrode, and a third output electrode at least partially overlapping the second gate line and spaced apart from the third input electrode, the first sub-pixel electrode is connected to the first output electrode, the second sub-pixel electrode is connected to the second output electrode, and the coupling electrode is connected to the third output electrode.

7. The display device of claim 1, wherein the first storage line comprises a sub-storage line protruding from the first storage line and extending in a second direction different from the first direction, the sub-storage line at least partially overlaps the first sub-pixel electrode.

8. The display device of claim 1, wherein the first display panel further comprises a first pixel unit and a second pixel unit each comprising the first sub-pixel electrode and the second sub-pixel electrode, the second display panel comprises a color filter layer comprising a red color filter, a green color filter, and a blue color filter, the red color filter or the green color filter is disposed to correspond to the first pixel unit, the blue color filter is disposed to correspond to the second pixel unit, a first area of a coupling electrode of the first pixel unit is smaller than a second area of a coupling electrode of the second pixel unit, and a common electrode is disposed on one of the first display panel and the second display panel.

9. The display device of claim 8, wherein the first sub-pixel electrode of the first pixel unit comprises a first slit pattern tilting at a first acute angle with respect to the first direction, the first sub-pixel electrode of the second pixel unit comprises a second slit pattern tilting at a second acute angle with respect to the first direction, and the second acute angle is smaller than the first acute angle.

10. The display device of claim 8, wherein the first sub-pixel electrode of the first pixel unit comprises a first slit pattern comprising a first open portion and a first electrode portion, the first sub-pixel electrode of the second pixel unit comprises a second slit pattern comprising a second open portion and a second electrode portion, and a width of the second open portion is greater than a width of the first open portion.

11. A display device, comprising:

a first display panel;

a second display panel facing the first display panel and comprising a common electrode; and a liquid crystal layer interposed between the first display panel and the second display panel, wherein the first display panel comprises:

a first gate line and a second gate line spaced apart from each other;

a first switching element and a second switching element both configured to receive a first gate signal from the first gate line;

a third switching element configured to receive a second gate signal from the second gate line and connected to a signal line;

a first sub-pixel electrode connected to the first switching element;

a second sub-pixel electrode connected to the second switching element; and a coupling electrode connected to the third switching element, wherein the second sub-pixel electrode overlaps the coupling electrode, and wherein at least one of the first switching element, the second switching element, and the third switching element is disposed between the first sub-pixel electrode and the second sub-pixel electrode.

12. The display device of claim 11, wherein the coupling electrode overlaps the second sub-pixel electrode to decrease a voltage of the second sub-pixel electrode.

13. The display device of claim 11, wherein the first gate line and the second gate line extend in a first direction, the first display panel further comprises a plurality of data lines extending in a second direction different from the first direction, and the signal line is spaced apart from the plurality of data lines and extends in the second direction.

14. The display device of claim 11, wherein the signal line comprises a first signal line and a second signal line spaced apart from each other, the first gate line and the second gate line extend in a first direction, and the first signal line and the second signal line are spaced apart from the first gate line and the second gate line and extend in the first direction.

15. The display device of claim 14, wherein the first display panel comprises a first pixel unit and a second pixel unit each comprising the first sub-pixel electrode and the second sub-pixel electrode, the third switching element of the first pixel unit is connected to the first signal line, the third switching element of the second pixel unit is connected to the second signal line, the first signal line is configured to receive a first signal, the second signal line is configured to receive a second signal, and the first signal and the second signal are complementary to each other.

16. The display device of claim 11, wherein the third switching element comprises a first input electrode at least partially overlapping the second gate line and branched from the signal line and a first output electrode at least partially overlapping the second gate line and spaced apart from the first input electrode, and the coupling electrode is connected to the first output electrode.

17. The display device of claim 11, wherein the first display panel further comprises a first pixel unit and a second pixel unit each comprising the first sub-pixel electrode and the second sub-pixel electrode, the second display panel comprises a color filter layer comprising a red color filter, a green color filter, and a blue color filter, the red color filter or the green color filter is disposed to correspond to the first pixel unit, the blue color filter is disposed to correspond to the second pixel unit, a first area of a coupling electrode of the first pixel unit is smaller than a second area of a coupling electrode of the second pixel unit, and a common electrode is disposed on one of the first display panel and the second display panel.

18. The display device of claim 17, wherein the first sub-pixel electrode of the first pixel unit comprises a first slit pattern tilting at a first acute angle with respect to the first direction, the first sub-pixel electrode of the second pixel unit comprises a second slit pattern tilting at a second acute angle with respect to the first direction, and the second acute angle is smaller than the first acute angle.

19. The display device of claim 17, wherein the first sub-pixel electrode of the first pixel unit comprises a first slit pattern comprising a first open portion and a first electrode portion, the first sub-pixel electrode of the second pixel unit comprises a second slit pattern comprising a second open portion and a second electrode portion, and a width of the second open portion is greater than a width of the first open portion.

20. A display device, comprising:

a first display panel comprising:

a first gate line;

a second gate line spaced apart from the first gate line;

a storage line spaced apart from the first gate line and the second gate line;

a first switching element and a second switching element both configured to receive a first gate signal from the first gate line;

a third switching element configured to receive a second gate signal from the second gate line;

a first sub-pixel electrode connected to the first switching element;

a second sub-pixel electrode connected to the second switching element; and a coupling electrode connected to the third switching element and partially overlapping the storage line, wherein at least one of the first switching element, the second switching element, and the third switching element is disposed between the first sub-pixel electrode and the second sub-pixel electrode.

21. The display device of claim 20, further comprising:

a second display panel facing the first display panel;

a liquid crystal layer interposed between the first display panel and the second display panel; and a common electrode disposed on one of the first display panel and the second display panel.

22. The display device of claim 21, wherein the first gate line, the second gate line, and the storage line are disposed between the first sub-pixel electrode and the second sub-pixel electrode.

23. The display device of claim 21, wherein the coupling electrode overlaps the storage line to decrease a voltage of the second sub-pixel electrode.

24. The display device of claim 23, wherein the storage line is configured to receive a storage voltage to decrease the voltage of the second sub-pixel electrode.

25. The display device of claim 24, wherein the first sub-pixel electrode and the second sub-pixel electrode are configured to be driven by an inversion driving method, and the storage voltage ranges from a high-level and a low-level with respect to a common voltage.

26. The display device of claim 23, wherein the first switching element comprises a first input electrode at least partially overlapping the first gate line and connected to a data line, and a first output electrode at least partially overlapping the first gate line and spaced apart from the first input electrode, the second switching element comprises a second input electrode at least partially overlapping the first gate line and connected to the first input electrode, and a second output electrode at least partially overlapping the first gate line and spaced apart from the second input electrode, the third switching element comprises a third input electrode at least partially overlapping the second gate line and connected to the second output electrode, and a third output electrode at least partially overlapping the second gate line and spaced apart from the third input electrode, the first sub-pixel electrode is connected to the first output electrode, the second sub-pixel electrode is connected to the second output electrode, and the coupling electrode is connected to the third output electrode.

27. The display device of claim 21, wherein the first display panel further comprises a first pixel unit and a second pixel unit each comprising the first sub-pixel electrode and the second sub-pixel electrode, the second display panel comprises a color filter layer comprising a red color filter, a green color filter, and a blue color filter, the red color filter or the green color filter is disposed to correspond to the first pixel unit, the blue color filter is disposed to correspond to the second pixel unit, and a first area of a coupling electrode of the first pixel unit is smaller than a second area of a coupling electrode of the second pixel unit.

28. The display device of claim 27, wherein the first sub-pixel electrode of the first pixel unit comprises a first slit pattern tilting at a first acute angle with respect to the first direction, the first sub-pixel electrode of the second pixel unit comprises a second slit pattern tilting at a second acute angle with respect to the first direction, and the second acute angle is smaller than the first acute angle.

29. The display device of claim 27, wherein the first sub-pixel electrode of the first pixel unit comprises a first slit pattern comprising a first open portion and a first electrode portion, the first sub-pixel electrode of the second pixel unit comprises a second slit pattern comprising a second open portion and a second electrode portion, and a width of the second open portion is greater than a width of the first open portion.

* * * * *